May 1, 1951 R. R. CONE 2,551,098
FILAMENTARY TUBULAR ARTICLE AND METHOD
OF PRODUCING THE SAME
Filed Jan. 10, 1946 2 Sheets-Sheet 2
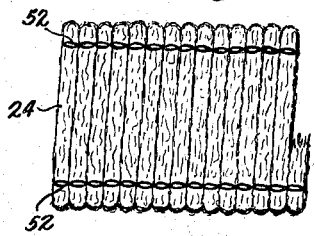
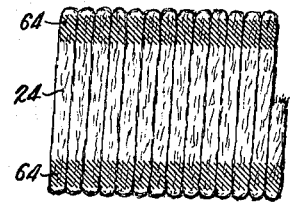
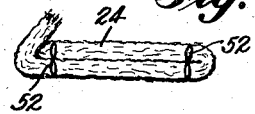
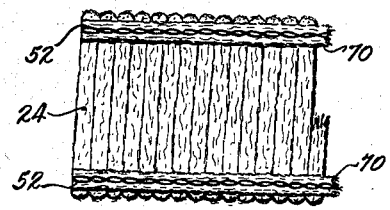
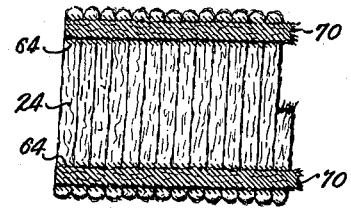
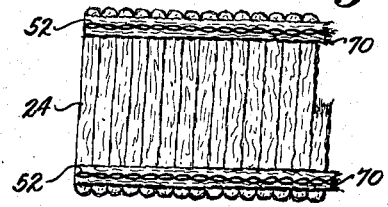
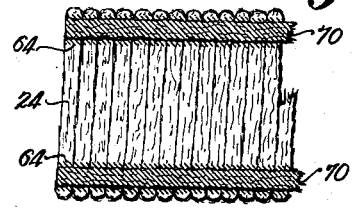
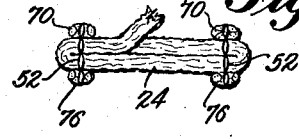
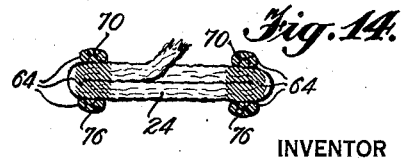
INVENTOR
Ralph R. Cone
BY
Raymond W Cotton
ATTORNEY Patented May 1, 1951

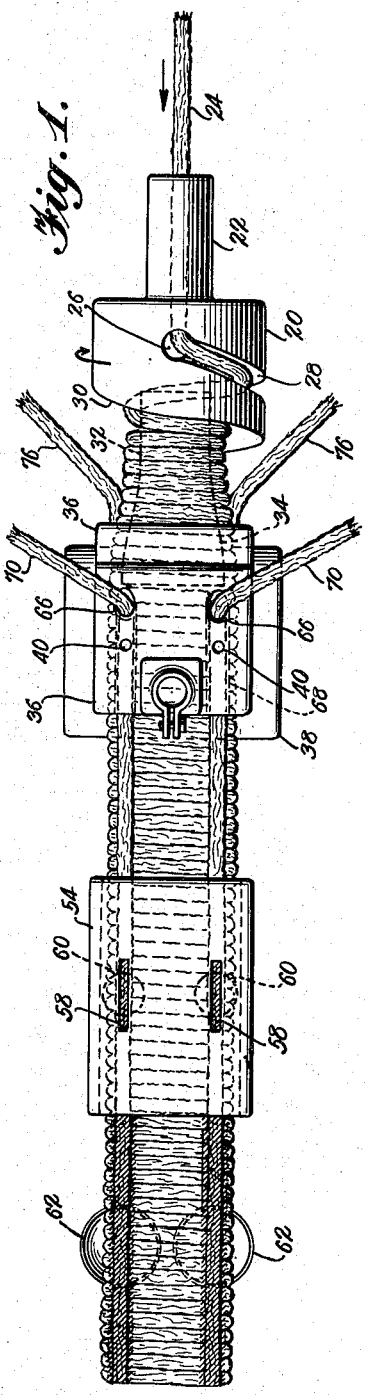
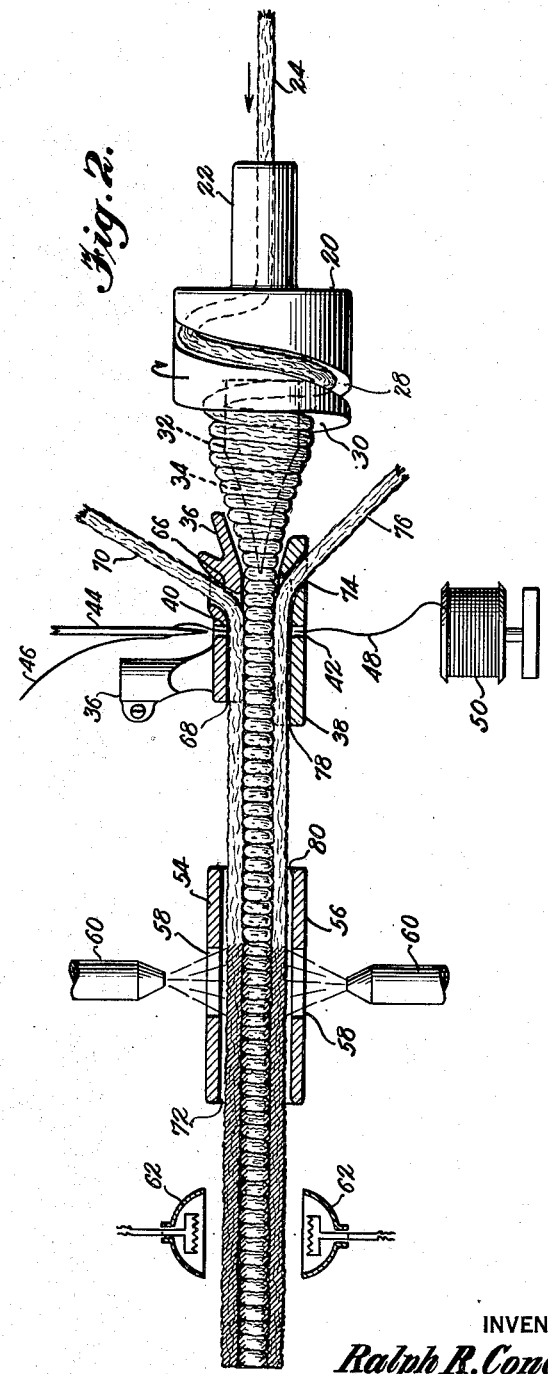

2,551,098

UNITED STATES PATENT OFFICE 2,551,098

FILAMENTARY TUBULAR ARTICLE AND METHOD OF PRODUCING THE SAME

Ralph R. Cone, Augusta, Ga., assignor to Riverside Mills, Augusta, Ga., a corporation of Georgia Application January 10, 1946, Serial No. 640,350

17 Claims. (Cl. 154—78)

This invention relates to textile products and methods of producing them.

A prior patent issued to the present inventor on March 21, 1944, No. 2,344,537, describes an article of manufacture comprising a textile filament wound and stitched to form a web suitable for varied uses in the textile arts. In an application for patent, Serial Number 575,232, filed on January 30, 1945, now Patent Number 2,482,655 issued on September 20, 1949, of which this application constitutes a continuation in part, a filament or filaments are wound temporarily on a mandrel and then manipulated form a product suitable for uses analogous to those proposed by the patent above mentioned.

The present invention contemplates products of the type described in the aforesaid application, Serial No. 575,232, as well as products otherwise produced, and methods attending the manufacture of such products.

As in the patent and application referred to, one of the principal uses contemplated for the products of this invention is the manufacture of rugs of the type wherein the pile is adhesively secured to suitable backing material. Various other applications of the products are contemplated however, among which are included tape, braid, tapestries, portieres, bed covers and trimmings.

In accordance with this invention one or more textile filaments are helically wound to form a substantially flat tube having contacting or unobstructed inner walls, the adjacent turns of which may be in contact. The tubes may be retained in their desired form by suitably fastening certain of the turns together by stitching or adhesive or both, applied longitudinally of the tube. Such fastening may be applied as a plurality of rows along the tube adjacent to or slightly spaced from its edges and may simultaneously serve to attach one or more spacing members near an edge or edges of the tube. The spacing member or members may assume the form of narrow filaments, applied singly or plurally in twisted, knitted, braided or other suitable condition. In any case, the outer edges of the flattened tubes are preferably exposed in order that adhesive materials applied thereto will readily penetrate the fibers at and/or adjacent to the tube edges.

The tube forming material is first wound to form a tube of substantially circular cross section which is then advanced along a path of substantially constant perimeter until the cross section is substantially flat. Such a path will necessarily be convergent in one dimension and divergent in another, since the width of the flattened tube or helix will be greater than the circular diameter of the tube first formed. The flattened tube may then have one or more spacing members applied longitudinally of one or more edges thereof, but whether or not such spacing material is applied, the tubes are retained in their flattened condition for the ultimate use for which they are intended. The mode of so retaining the tubes in this condition may include stitching or adhesive or both, with or without the spacing material which will be incorporated or omitted, depending upon the purpose to be served by the product.

Accordingly, it is an object of this invention to manufacture products and practice methods of the types outlined above in a relatively simple, inexpensive and rapid manner.

A more complete understanding of the invention will follow from a description of the accompanying drawings, wherein:

Fig. 1 is a somewhat diagrammatic plan of one form of apparatus and product contemplated;

Fig. 2 is a somewhat diagrammatic elevation of the apparatus and product of Fig. 1; and Figs. 3 to 14 inclusive are fragmentary plans (odd numbered figures) and elevations (even numbered figures) of some of the products contemplated.

The rotary head 20, comparable with that disclosed in application Ser. No. 575,232, is provided with a hollow spindle 22, through which thread, yarn or filamentary material 24 is led to the hollow interior of the head and then through a radial port 26 into a peripheral groove 28 which terminates in a helical end 30 formed on the head. Rotary motion is imparted to the head by any suitable driving means, not shown. The thread, yarn or filamentary material, which terms are employed interchangeably herein, is fed from the head to a relatively fixed mandrel 32, shown in broken lines in Figs. 1 and 2 as extending into a counterbore formed at the delivery end of the head and providing a bearing for the head.

As clearly disclosed in said copending application, the portion of the mandrel adjacent the head is substantially circular in cross section for a length sufficient to form a helical coil or tube. This circular portion of the mandrel merges with an outer portion 34 of tapered configuration in one dimension, as clearly depicted in Fig. 2, terminating in a relatively thin, substantially rectangular end. It should be noted that the perimeter or circumference of the mandrel is substantially constant throughout the circular and tapered portions to assure uniform tension in the material wound thereon.

The reduced end of the mandrel is shown in Figs. 1 and 2 as received between a presser foot 36 and a throat plate 38 which converge at a rate corresponding to the taper of the mandrel to receive the flat tube of material formed by winding the yarn and then flattening the resulting tube. Openings 40 are provided through the presser foot, and aligned therewith, openings 42 through the throat plate for passage of needles 44 employed to stitch the turns of the flattened tube together in order to retain it in desired form. The needles are supplied with suitable thread 46 which cooperates with similar thread 48 from a bobbin 50 to effect the sewing operation.

The product resulting from the steps described thus far is depicted in Figs. 3 and 4 of the drawings wherein the yarn 24 has been arranged in the form of a flattened helical tube having adjacent convolutions substantially in contact, and substantially unobstructed contacting internal walls, retained in desired form by means of stitching 52.

Beyond the stitching station in the path of the flattened tube as shown in Figs. 1 and 2, adhesive applying apparatus is shown. Upper and lower shields 54 and 56 are arranged above and below, respectively, the advancing tube, each shield being provided with a pair of slots 58 in registry with portions of the flattened tube near its edges to permit the application of suitable adhesive material in parallel rows extending longitudinally of the tube. Suitable nozzles 60 have been depicted for the purpose, but other modes of applying adhesive are equally or more suitable in some cases and can be substituted where necessary. The stitching and adhesive applying stations can be interchanged where the characteristics of the products require it, and in a great many applications of the present invention, stitching alone or adhesive alone can be relied upon to retain the tube assembled in its flattened condition.

Where adhesive is employed, depending upon its properties, it may be desirable to hasten its drying, for which purpose, radiant electric heaters 62 have been depicted diagrammatically in the tube path beyond the adhesive applying apparatus.

The use of adhesive alone to retain the tube in its desired form results in products of the type shown in Figs. 5 and 6 of the drawings wherein the yarn 24 has its convolutions united along spaced portions in the regions of the tube edges by means of a suitable adhesive composition 64.

In cases where it is desired to provide spacing members near the tube edges, either for ornamental purposes or where a reduced pile density is preferred in the manufacture of rugs, the plate 36, whether it be the presser foot or a guide plate in advance of the uniting step, is provided with a pair of openings 66, shown in Fig. 1 as aligned with the needle openings 40 of the presser foot, penetrating to the under side of the plate where they join grooves 68 extending to the after edge of the plate to serve as channels for guiding spacing members 70, which may assume the form of narrow filaments, such as yarn, thread or the like, in the form of a strand or in twisted, knitted, braided or other suitable condition. The shield 54 is likewise shown as having its lower surface provided with grooves 72 which likewise serve as guides for the spacing members.

In Figs. 7 and 8 a product formed by fastening the spacing members 70 by stitching 52 which likewise unites the turns of yarn 24, is illustrated.

Figs. 9 and 10 show the spacing members 70 as united to the yarn 24 defining the flattened tube by means of a suitable adhesive 64 which likewise unites the turns themselves.

When spacing members are to be applied to the lower surface of the tube alone, or in addition to those applied to the upper surface, the plate 38, whether it be the throat plate as shown in Fig. 2 or another plate where, for example, stitching is not utilized, is provided with openings 74 for the receipt of spacing material 76 similar to that applied to the upper surface. These openings 74 intersect grooves 78 formed on the upper surface of the plate 38 which guide the spacing material in proper alignment with the flattened tube. The lower shield 56 has its upper surface provided with similar grooves 80 for a similar purpose.

A product having spacing members 70 applied to the upper surface and spacing members 76 applied to the lower surface by stitching 52 which also unites the turns of yarn 24 constituting the tube is represented in Figs. 11 and 12.

The use of adhesive 64 to unite the turns of yarn 24 as well as upper and lower spacing members 70 and 76 respectively is shown in Figs. 13 and 14.

The foregoing description and accompanying drawings illustrate typical forms of the invention, which should not be construed as restrictive beyond the scope of the appended claims.

I claim:

1. A tubular article of manufacture comprising a textile filament wound to form a substantially unobstructed flat tube, said tube having completely contacting inner walls.

2. A tubular article of manufacture comprising a textile filament wound with adjacent turns in contact to form a substantially unobstructed flat tube, said tube having completely contacting inner walls.

3. A tubular article of manufacture comprising a textile filament wound upon itself to form two layers defining a substantially unobstructed flat tube having completely contacting inner walls, the axis of said filament extending predominantly substantially normally to the axis of said tube.

4. A tubular article of manufacture comprising a plurality of textile filaments wound to form a substantially unobstructed flat tube having completely contacting inner walls and a width substantially greater than the aggregate transverse dimensions of said filaments.

5. An article of manufacture comprising a textile filament wound to form a substantially unobstructed flat tube having completely contacting inner walls, and a row of stitching extending longitudinally of said tube engaging turns of said filament.

6. An article of manufacture comprising a textile filament wound to form a substantially unobstructed flat tube having completely contacting inner walls, and a plurality of rows of stitching extending longitudinally of said tube engaging adjacent turns of said filament.

7. A tubular article of manufacture comprising a textile filament wound in the form of a substantially flat tube having unobstructed completely contacting inner walls and exposed outer edges, adjacent turns of said tube being united in the region of said edges.

8. A tubular article of manufacture comprising a textile filament wound in the form of a substantially flat tube having unobstructed contacting inner walls and exposed outer edges, adjacent turns of said tube being adhesively united in the region of said edges.

9. A tubular article of manufacture comprising a textile filament wound in the form of a substantially flat tube having unobstructed completely contacting inner walls and exposed outer edges, adjacent turns of said tube being stitched in the region of said edges.

10. A tubular article of manufacture comprising a textile filament wound in the form of a substantially flat tube having unobstructed inner walls and exposed outer edges, and a relatively narrow spacing member fastened to an outer surface of said tube and lying completely within the width of said tube adjacent an edge thereof.

11. A tubular article of manufacture comprising a textile filament wound in the form of a substantially flat tube having unobstructed inner walls and exposed outer edges, and relatively narrow spacing members fastened adjacent opposite edges of the outer surface of said tube and lying completely within the width of said tube.

12. A tubular article of manufacture comprising a textile filament wound in the form of a substantially flat tube having unobstructed completely contacting inner walls and exposed outer edges, and relatively narrow spacing members fastened to outer surfaces of said tube respectively, adjacent at least one edge thereof.

13. A tubular article of manufacture comprising a textile filament wound in the form of a substantially flat tube having unobstructed completely contacting inner walls and exposed outer edges, and relatively narrow spacing members fastened to opposed outer surfaces of said tube adjacent the edges thereof.

14. A tubular article of manufacture comprising a textile filament wound in the form of a substantially flat tube having unobstructed contacting inner walls and exposed outer edges, and a relatively narrow spacing member adhesively fastened to an outer surface of said tube adjacent an edge thereof.

15. An article of manufacture comprising a textile filament wound in the form of a substantially flat tube having unobstructed inner walls and exposed outer edges, and a relatively narrow spacing member stitched to an outer surface of said tube adjacent an edge thereof and lying completely within the width of said tube.

16. A tubular article of manufacture comprising a textile filament wound in the form of a substantially flat tube having unobstructed inner walls and exposed outer edges, relatively narrow spacing members extending longitudinally of said tube adjacent edges thereof and lying completely within the width of said tube, and means uniting adjacent turns of said tube and said spacing members.

17. A method for producing flattened helical bodies from filamentary material comprising winding filamentary material to form a helix of substantially circular cross section, feeding the helix along a convergent path of substantially constant perimeter until the cross section of said helix is substantially flat and adhesively fastening the convolutions of the body thus formed adjacent the edges thereof.

RALPH R. CONE.

REFERENCES CITED

The following references are of record in the file of this patent:

UNITED STATES PATENTS

| Number | Name | Date |
|---|---|---|
| 645,236 | Schlegel | Mar. 13, 1900 |
| 1,907,492 | Brewster | May 9, 1933 |
| 2,061,559 | Brown | Nov. 24, 1936 |
| 2,202,663 | Lahey | May 28, 1940 |
| 2,482,655 | Cone | Sept. 20, 1949 |